US008511639B2

(12) United States Patent
Johnson

(10) Patent No.: US 8,511,639 B2
(45) Date of Patent: Aug. 20, 2013

(54) ADAPTOR FOR USE WITH A VALVE FITMENT

(75) Inventor: James W. Johnson, Delaware, OH (US)

(73) Assignee: Liqui-Box Corporation, Worthington, OH (US)

( * ) Notice: Subject to any disclaimer, the term of this patent is extended or adjusted under 35 U.S.C. 154(b) by 105 days.

(21) Appl. No.: 13/295,679

(22) Filed: Nov. 14, 2011

(65) Prior Publication Data

US 2012/0118416 A1 May 17, 2012

Related U.S. Application Data

(60) Provisional application No. 61/413,628, filed on Nov. 15, 2010.

(51) Int. Cl.
*F16L 37/28* (2006.01)
*F16L 29/00* (2006.01)

(52) U.S. Cl.
USPC ......... 251/149.6; 251/144; 251/148; 141/346

(58) Field of Classification Search
USPC ................ 251/149.6, 144, 145, 147, 148, 82, 251/83, 319–322; 141/319–322
See application file for complete search history.

(56) References Cited

U.S. PATENT DOCUMENTS

| | | | |
|---|---|---|---|
| 3,495,057 | A | 2/1970 | Golota |
| 4,286,636 | A | 9/1981 | Credle |
| 4,305,517 | A | 12/1981 | Dennis |
| 4,371,089 | A | 2/1983 | Barendregt |
| 4,421,146 | A | 12/1983 | Bond et al. |
| 4,445,539 | A | 5/1984 | Credle |
| 4,445,550 | A | 5/1984 | Davis et al. |
| 4,445,551 | A | 5/1984 | Bond et al. |
| 4,564,132 | A | 1/1986 | Lloyd-Davies |

(Continued)

FOREIGN PATENT DOCUMENTS

| | | |
|---|---|---|
| CA | 2371239 | 12/2000 |
| CA | 2554832 | 8/2005 |
| EP | 0156500 | 10/1985 |
| WO | WO 2004/085283 | 7/2004 |

OTHER PUBLICATIONS

Co-pending U.S. Appl. No. 11/895,843, European Search Report EP07800537, mailed Jun. 7, 2011.

*Primary Examiner* — John K Fristoe, Jr.
*Assistant Examiner* — David Colon Morales
(74) *Attorney, Agent, or Firm* — Potter Anderson Corroon LLP; Rakesh H. Mehta, Esq

(57) ABSTRACT

This invention relates to an adaptor used in a fitment valve assembly, said adaptor comprising an outer ring collar having a top and a bottom, and an outer and an inner surface; a flange molded to the bottom of said outer ring collar; an interior ring collar having a top and a bottom, and an outer and an inner surface molded in adjacent relationship to said outer ring collar near the top of said interior ring collar; an inverted dome structure molded toward the bottom of said inner surface of said interior ring collar defining at least one opening for the flow of fluid there-through; a groove for an O-ring molded in said inner surface of said interior ring collar above said dome structure; a lip molded onto said bottom of said interior ring collar for forming a seal with said fitment valve assembly; and a groove for an O-ring molded in said outer surface at the bottom of said interior ring collar.

11 Claims, 4 Drawing Sheets

(56) References Cited

U.S. PATENT DOCUMENTS

| | | | |
|---|---|---|---|
| 5,009,323 A | 4/1991 | Montgomery et al. | |
| 5,031,662 A | 7/1991 | Roethel | |
| 5,072,756 A | 12/1991 | Carr | |
| 5,095,962 A | 3/1992 | Lloyd-Davies et al. | |
| 5,255,713 A | 10/1993 | Scholle | |
| 5,303,837 A | 4/1994 | Adams et al. | |
| 5,456,375 A | 10/1995 | May | |
| 5,598,877 A * | 2/1997 | Reidel | 141/346 |
| 5,680,970 A | 10/1997 | Smith et al. | |
| 5,697,410 A | 12/1997 | Rutter et al. | |
| 5,746,247 A | 5/1998 | Schletht et al. | |
| D397,767 S | 9/1998 | Gustafsson | |
| 5,823,224 A | 10/1998 | Gomez | |
| 5,832,737 A | 11/1998 | Moilanen | |
| 5,901,761 A | 5/1999 | Rutter et al. | |
| 5,950,665 A | 9/1999 | Claus | |
| 5,983,964 A | 11/1999 | Zielinksi et al. | |
| D421,098 S | 2/2000 | Wrigley et al. | |
| 6,347,785 B1 | 2/2002 | Copp et al. | |
| 6,375,157 B1 | 4/2002 | Van De Lande | |
| 6,561,386 B1 | 5/2003 | Martens | |
| 6,612,545 B1 * | 9/2003 | Rutter et al. | 251/149.6 |
| 6,637,725 B2 | 10/2003 | Davis et al. | |
| 6,648,016 B2 | 11/2003 | Farrenkopf et al. | |
| 6,702,337 B2 | 3/2004 | Rutter et al. | |
| 6,779,556 B2 | 8/2004 | Roethel | |
| D501,673 S | 2/2005 | Bressler et al. | |
| 6,892,760 B2 * | 5/2005 | Roos et al. | 137/614.03 |
| 6,895,952 B1 * | 5/2005 | Bachelder | 126/25 R |
| D508,111 S | 8/2005 | Karasawa | |
| 6,953,070 B1 | 10/2005 | Labinski | |
| D511,203 S | 11/2005 | Bressler et al. | |
| D521,596 S | 5/2006 | Nimberger | |
| D521,597 S | 5/2006 | Nimberger | |
| 7,114,702 B2 | 10/2006 | Sauer | |
| 7,314,211 B2 * | 1/2008 | Vallon et al. | 251/321 |
| 7,487,951 B2 | 2/2009 | Johnson | |
| D601,671 S | 10/2009 | Johnson | |
| D607,090 S | 12/2009 | Johnson | |
| D617,880 S | 6/2010 | Johnson | |
| D618,763 S | 6/2010 | Johnson | |
| 7,882,977 B2 | 2/2011 | Johnson | |
| D641,832 S | 7/2011 | Johnson | |
| 2002/0139423 A1 | 10/2002 | Roethel | |
| 2008/0053568 A1 | 3/2008 | Johnson | |

* cited by examiner

ADAPTOR FOR USE WITH A VALVE FITMENT

CROSS-REFERENCE TO RELATED APPLICATION

This application claims priority from provisional U.S. Patent Application No. 61/413,628 filed on Nov. 15, 2010, which is incorporated by reference herein in its entirety.

FIELD OF INVENTION

This invention generally relates to an adaptor for a valve fitment assembly used to dispense liquids from a collapsible bag or a container. Specifically, the adaptor allows for the valve fitment assembly to be used in conjunction with a spout attached to a container holding the dispensable liquid.

BACKGROUND

U.S. Patent Application Publication No. 2008/0053568 shows a slider valve fitment and collar for dispensing liquid from a collapsible bag or a container. However, this fitment and collar can only be used in conjunction with a certain design of spout and valve assembly that is attached to the container. Containers having a different spout and valve assembly design cannot be used with this slider valve fitment and collar.

The adaptor of this invention allows for the use of such a slider valve fitment and collar with other spout and valve assemblies attached to a fluid container.

SUMMARY OF THE INVENTION

This invention relates to an adaptor used in a fitment valve assembly, said adaptor comprising:

(A) an outer ring collar having a top and a bottom, and an outer and an inner surface,
  wherein said outer ring collar has threads moulded into said outer surface of said outer ring collar, and
  wherein said outer ring collar has threads moulded into said lower inner surface of said outer ring collar;
(B) a flange moulded to the bottom of said outer ring collar;
(C) an interior ring collar having a top and a bottom, and an outer and an inner surface moulded in adjacent relationship to said outer ring collar near the top of said interior ring collar,
  wherein said outer surface of the top part of said inner ring collar and the top part of said inner surface of said outer ring collar forms a U-shaped channel for receiving a part of said fitment valve assembly,
  wherein the lower part of said outer surface of said interior ring collar and the lower part of said inner surface of said outer ring collar form a lower U-shaped channel for receiving a part of said fitment valve assembly, and
  wherein said outer surface of said interior ring collar having a groove around said bottom of said interior ring collar for positioning an O-ring being part of said fitment valve assembly;
(D) an inverted dome structure moulded toward the bottom of said inner surface of said interior ring collar defining at least one opening for the flow of fluid there-through;
(E) a groove for an O-ring moulded in said inner surface of said interior ring collar above said dome structure;

(F) a lip moulded onto said bottom of said interior ring collar for forming a seal with said fitment valve assembly; and
(G) a groove for an O-ring moulded in said outer surface at the bottom of said interior ring collar.

This invention further relates to a fitment valve assembly comprising:

(A) a fitment for attachment to a container for holding and dispensing a fluid,
  wherein said container has a generally cylindrical spout attached thereto,
  wherein said fitment comprises a generally cylindrical external valve body movable to a fixed position within the spout and a generally cylindrical internal valve body movable axially within the external valve body,
  wherein said internal valve body is movable between a closed position operable to prevent the flow of fluid through said fitment and an open position operable to allow the flow of fluid through said fitment,
  wherein said internal valve body is movable between closed and open positions by insertion of a dispensing connector into said external valve body adjacent said internal valve body, wherein said internal valve body being is biased toward the closed position; and
(B) a collar for attachment to said dispensing connector and for releasable coupling to said fitment,
  wherein when coupled to said fitment said collar compressively engages said external valve body to form a seal between said external valve body and said dispensing connector and further comprises said adaptor of Claim 1 positioned between said fitment and said cylindrical spout of said container containing fluid.

This invention also relates to a process for dispensing fluid from a container, wherein said container has a spout attached to it, and wherein said spout is in contact with a fitment valve through an adaptor described Claim 1.

DETAILED DESCRIPTION OF THE INVENTION

In the present description, any range for a numerical quantity is disclosed in an abbreviated manner, simply to avoid listing and describing each and every value within the range. Any appropriate value within the range can be selected as the upper value, lower value, or the terminus of the range.

As used herein, the singular form of a word includes the plural, and vice versa, unless the context clearly dictates otherwise. Thus, the references “a,” “an,” and “the” are generally inclusive of the plurals of the respective terms. For example, reference to "a method" includes a plurality of such "methods." Likewise, the terms "include," "including," and "or" should all be construed to be inclusive, unless such construction is clearly prohibited from the context. Similarly, the term "examples," particularly when followed by a listing of terms, is merely exemplary and illustrative and should not be deemed to be exclusive or comprehensive.

The term "comprising" is intended to include embodiments encompassed by the terms "consisting essentially of" and "consisting of." Similarly, the term "consisting essentially of" is intended to include embodiments encompassed by the term "consisting of."

The methods and compositions and other advances disclosed herein are not limited to particular equipment or processes described herein because, as the skilled artisan will appreciate, they may vary. Further, the terminology used herein is to describe particular embodiments only, and is not intended to, and does not, limit the scope of what is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

Figure 1:
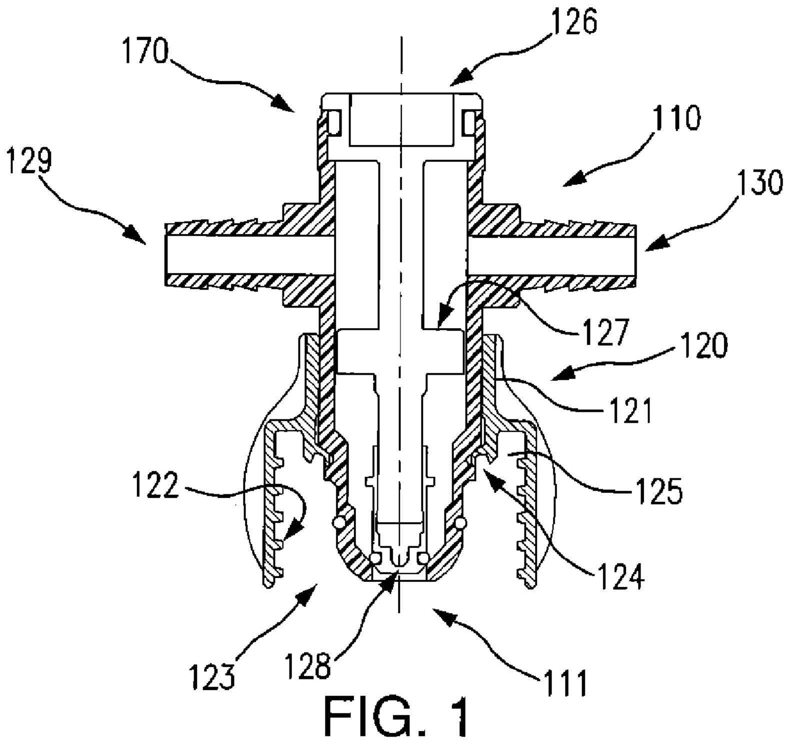
FIG. 1 is a cross section of a valve fitment assembly of a dispensing connector and a collar.
Figure 1A:
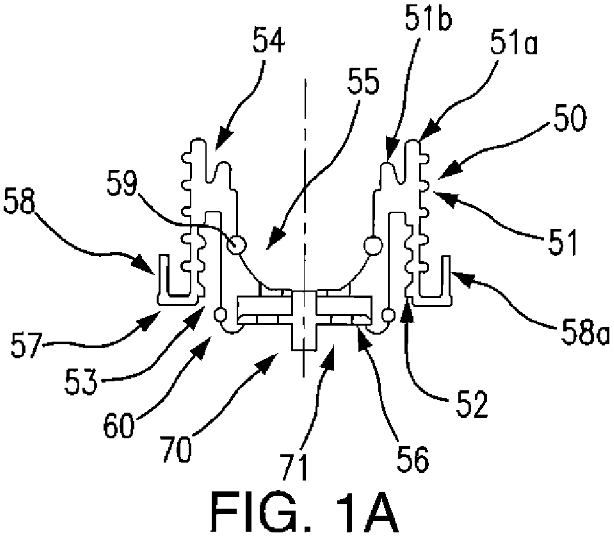
FIG. 1A is a cross section of the adaptor.
Figure 1B:
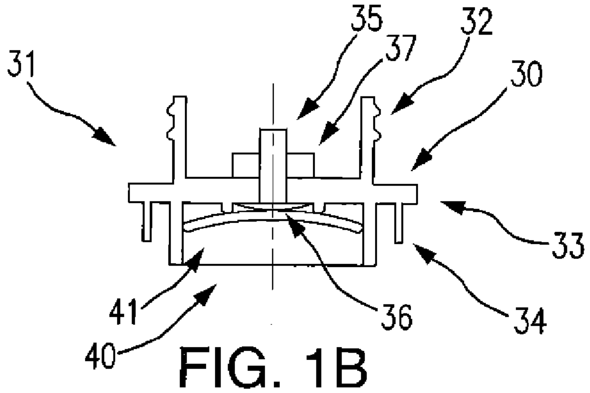
FIG. 1B is a cross section of the cylindrical spout and valve assembly in connection with a fluid container.

FIGS. 1, 1A, and 1B show a cross section of a fitment assembly attached to a fluid container. Specifically, FIG. 1 is a cross section of a dispensing connector no; FIG. 1A is a cross section of an adaptor 50; and a FIG. 1B is a cross section of a cylindrical spout and valve assembly 30.

FIG. 1 shows the dispensing connector no positioned in collar 120. The dispensing connector no comprises valve stem 126 having a collar 127 and a nipple 128 attached at the end of the valve stem 126. The connector has two exit ports 129 and 130, and fluid from the fluid container 40 (FIG. 113) flows through these ports when the dispensing connector is in an open position. Collar body 121 is in an abutting relationship with the dispensing connector no and has an internal threaded flange 122 which engages with the threaded external outer ring 51 of the adaptor 50 (FIG. 1A). A receiving space 123 allows the adaptor 50 to be positioned in the receiving space 123 as shown in FIG. 2.

Shown in FIG. 1A is the adaptor 50 (details in FIG. 3) having a threaded external outer ring collar 51 that is screwed into and meshed with the internal threads of the threaded flange 122 of the collar body 121. The top 51*a* of the threaded external outer ring collar 51 is sealed with the grooved area 125 of the collar body 121. Also, the U-shaped channel 54 formed by the outer ring collar 51 and the inner ring collar 51*b* of the adaptor 50 is sealed in grove 124 of the collar body 121. These seals prevent leakage of fluid from the container 40 as the fluid is being dispensed. Moulded to the collar 51 of the adaptor 50 is a flange 57 that holds the collar body 121 in place. Locking tabs 58 and 58*a* are attached to flange 57 and lock the collar body 121 in place to prevent movement and leakage of fluid being dispensed. Groove 59 of the adaptor 50 has an O-ring (not shown) positioned therein to form a seal with the dispensing connector 110. Groove 60 positioned at the bottom of the adaptor 50 having an O-ring (not shown) forms a seal with cylindrical spout 31. Ridge 56 positioned at the bottom of the adaptor 50 retains valve opening device 70 that depresses valve assembly 35 positioned in cylindrical spout 31 to allow flow of liquid from container 40.

FIG. 1B shows the cylindrical spout and valve assembly 30 attached by conventional means, such as by heat sealing or with an adhesive, to fluid container 40. The cylindrical spout 31 has an exterior threaded collar 32 that meshes with the internal threaded part of the collar 52 of the adaptor 50 and is positioned in receiving space 53 of the adaptor 50. Spout flange 33 is in contact with flange 57 of the adaptor. A cylindrical support collar 34 is attached to flange 33 that supports flange 33 and rests on rest on the fluid container 40. Valve assembly 35 is positioned in the center of the cylindrical spout and valve assembly 30 and when the valve head 36 is depressed on engagement with the valve opening device 70 positioned below the adaptor so and which is actuated by nipple 128 of the valve stem 126 when the valve stem 126 is engaged into its open position, the top of the fluid container 41 is depressed and opened and fluid follows out of the fluid container 40 out through disc 70 having openings therein (FIG. 3A) and through dispenser connector no and out through the fluid exit ports 129 and 130.

Figure 2:
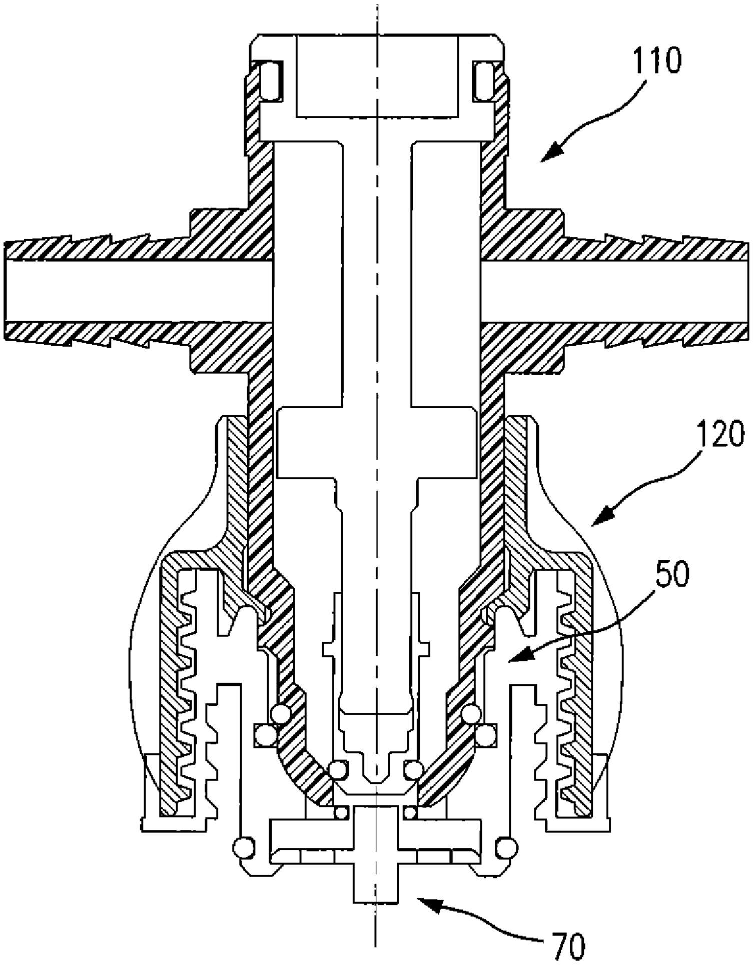
FIG. 2 and FIG. 2A are the same cross sections as shown FIGS. 1, 1A, and 1B except the fitment assembly is engaged with the adaptor and in a spatial relationship with spout and valve assembly of the fluid container.

FIG. 2 shows the dispensing connector 110 positioned in the collar 120 with the adaptor 50 positioned in the collar 120 and the valve opening device 70 positioned in the bottom of the adaptor 50. The cylindrical spout and valve assembly 30 having valve assembly 35 positioned therein is in contact with fluid container 40.

Figure 3:
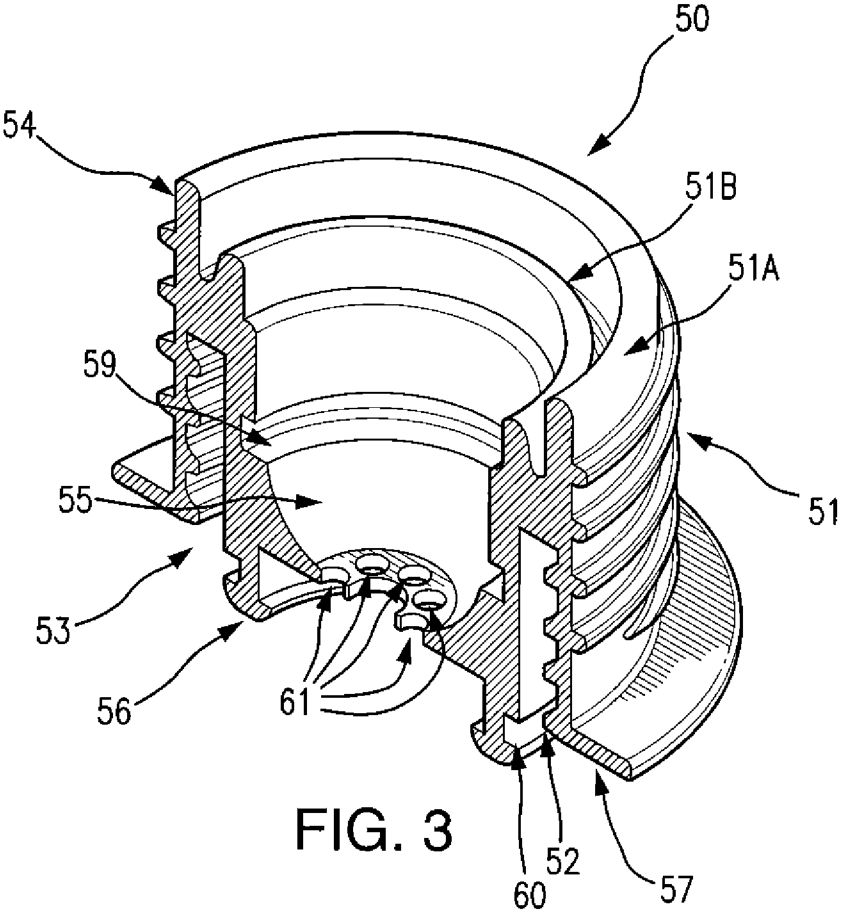
FIG. 3 is a vertical cross section shown in a perspective view of the adaptor.

FIG. 3 shows a vertical cross section of the adaptor 50. Threaded external outer ring collar 51 having threads of the outside is moulded to flange 57 and has internal threads 52. A U-shaped channel 54 is moulded therein for receiving and sealing the collar 120 (shown in FIG. 1). Groove 59 forms a seal with the dispersion connector no. An O-ring (not shown) is positioned in this groove. Receiving space 53 receives the threaded collar 32 of the cylindrical spout 30 (shown in FIG. 1B) and forms a seal therewith to prevent leakage of fluid being dispensed. The dome-shaped area 55 of the adaptor 50 defines openings 61 for the flow of fluid from the container 40 when the valve assembly 35 (FIG. 1) is opened by the valve stem 126.

Figure 3A:
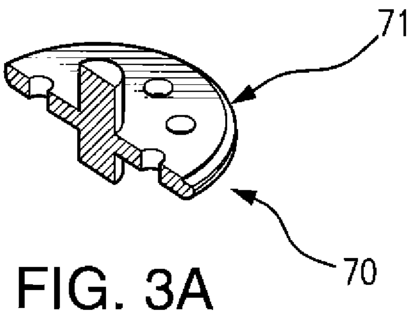
FIG. 3A is a vertical cross section of the valve opening device.

FIG. 3A shows a cross section of the valve opening device 70 having a disc with openings 71 moulded thereto to allow flow of fluid. The valve opening device is positioned below the center of the inverted dome 55 of the adaptor 50.

Figure 4:
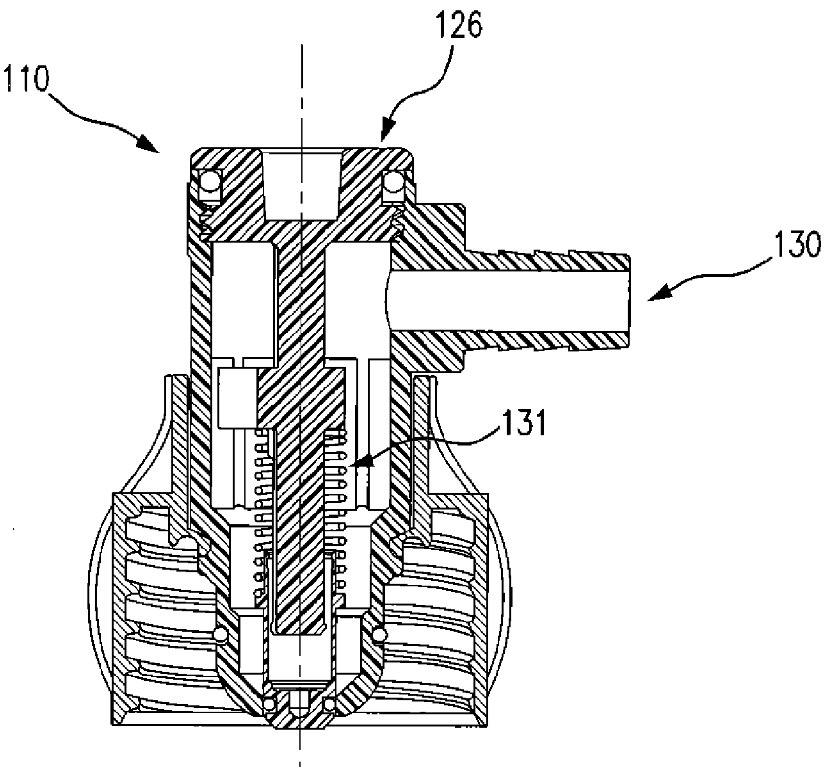
FIG. 4 is cross sections of valve fitment assembly having single fluid exist.

FIG. 4 shows a cross section of a valve fitment assembly 110 having a single fluid exit port 130. A spring 131 actuates the valve stem 126. The operation of the valve fitment assembly is as described for FIG. 1.

Figure 4A:
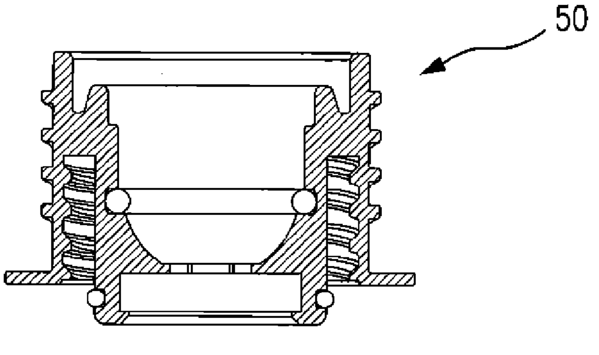
FIG. 4A is a cross section of the adaptor.
Figure 4B:
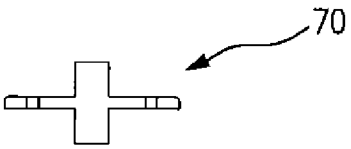
FIG. 4B is a cross section of the valve opening device.

FIG. 4A shows the adaptor 50 in fitting relationship to the valve fitment assembly and FIG. 4B shows the valve opening device in relationship to the adaptor 50.

The following is a description of the operation of the fitment, adaptor and spout and valve assembly for the release of fluid from a container. Valve stem 126 of the dispensing connector 110 is depressed, which can be accomplished simply by sliding the valve stem into an engaged position or the valve stem can be threaded in the dispensing connector 110 and rotated into the engaged position. The nipple 128 attached to the bottom of the valve stem 126 engages the valve opening device 70 thereby depressing the valve head 36 and the top 41 of the fluid container 40 is depressed and opened and fluid from the container 40 flows through openings in the bottom of the cylindrical spout 31 wherein ribs 37 encircle the valve head 36 but provide opening for the flow of fluid. The fluid then flows thorough disc 71 moulded to the valve opening device 70. Disc 71 defines openings to provide for the flow of fluid. Fluid then passes through openings 61 of the adaptor 50. FIG. 3 shows the openings 61 in the dome of the adaptor. At least one opening is required but preferably 4-8 openings are used. The fluid then passes around valve stem 126 and through the openings in collar 127 of the valve stem. Collar 127 provides stability to the valve stem 126 to prevent unwanted motion or displacement of the valve stem 126. The fluid then flows out through either or both exists 129 and 130 of the dispensing connector 110.

In a preferred embodiment, the adaptor is moulded from an elastomer, such as a polyurethane or a thermoplastic, such as high density polyethylene or polypropylene.

This invention also relates to a process for dispensing fluid from a collapsible bag or a container wherein a spout attached to said collapsible bag or said container is in contact with a valve fitment through an adaptor described supra.

These and other aspects of the invention do not limit the understanding and communication of the invention, as expressed in the appended claims.

LISTING OF PARTS OF FIGURES

Figure 2A:
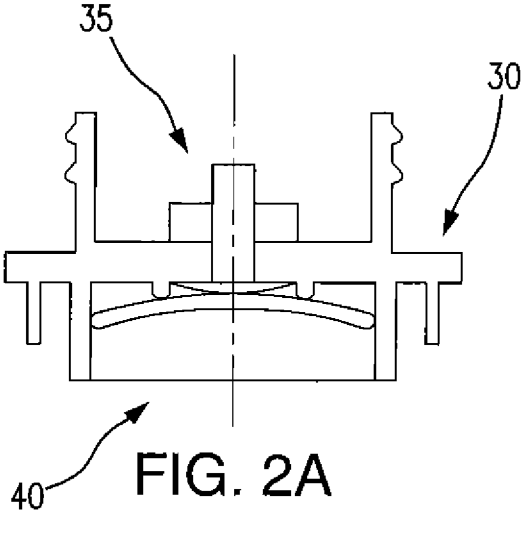

FIGS. 1, 1A & 1B
110 Dispensing Connector
111 Open end of Dispensing Connector
120 Collar
121 Collar body
122 Internal threaded flange of collar body
123 Receiving space in collar body
124 Groove for placement of adaptor 50
125 Grooved area for receiving 51*a* (threaded collar of adaptor 50)
126 Valve stem
127 Collar surrounding valve stem
128 Nipple attached to end of valve stem
129/130 Fluid exits ports from dispensing connector
50 Adaptor
51 Threaded external outer ring collar of adaptor
51*a* Top of threaded outer ring collar of adaptor
51*b* Inner ring collar of adaptor
52 Internal threaded part of the collar of the adaptor
53 Receiving space for threaded collar of cylindrical spout 30
54 U-shaped channel for receiving and sealing collar 120
55 Inverted dome of adaptor having openings not shown but shown in FIG. 2
56 Ridge for holding valve opening device.
57 Flange
58 Locking tab for holding collar 120 in place
58*a* Locking tab for holding collar 120 in place
59 Groove having an O-ring (not shown) positioned therein for sealing dispersion connector.
60 Groove having an O-ring (not shown) positioned therein to seal cylindrical spout 31.
61 Opening in dome of adaptor for fluid flow
70 Valve opening device for depressing valve head 36.
30 Cylindrical spout and valve assembly
31 Cylindrical spout
32 Threaded collar of cylindrical spout
33 Spout flange
34 Cylindrical support collar
35 Valve assembly for flow of liquid from fluid container 40
36 Valve head
37 Ribs surrounding valve head providing opening for fluid flow
40 Fluid container
41. Top of fluid container in contact with valve head 46
FIGS. 2 & 2A
50 Adaptor
110 Dispensing Connector
30 Cylindrical spout and valve assembly
35 Valve Assembly
41 Fluid container
70 Valve opening device
71 Disc with openings
FIGS. 3 & 3A
50 Adaptor
51 Threaded collar of adaptor
52 Internal threaded part of the collar of the adaptor
53 Receiving space for threaded collar of cylindrical spout 30
54 U-shaped channel for receiving and sealing collar 120
55 Concave dome of adaptor having openings
56 Openings in concave dome to allow for the flow of fluid from the fluid container.
57 Flange
58 Locking tabs for holding collar 120 in place (not shown but shown in FIG. 1)
59 Groove with O-ring (not shown) for sealing dispersion connector.
60 Groove with O-ring (not shown) for sealing cylindrical spout 31.
70 Valve opening device
FIG. 4
131 Spring

The invention claimed is:

1. An adaptor used in a fitment valve assembly, said adaptor comprising:

(A) an outer ring collar having a top and a bottom, and an outer and an inner surface,
 wherein said outer ring collar has threads moulded into said outer surface of said outer ring collar, and
 wherein said outer ring collar has threads moulded into said lower inner surface of said outer ring collar;

(B) a flange moulded to the bottom of said outer ring collar;

(C) an interior ring collar having a top and a bottom, and an outer and an inner surface moulded in adjacent relationship to said outer ring collar near the top of said interior ring collar,
 wherein said outer surface of the top part of said inner ring collar and the top part of said inner surface of said outer ring collar forms a U-shaped channel for receiving a part of said fitment valve assembly,
 wherein the lower part of said outer surface of said interior ring collar and the lower part of said inner surface of said outer ring collar form a lower U-shaped channel for receiving a part of said fitment valve assembly, and
 wherein said outer surface of said interior ring collar having a groove around said bottom of said interior ring collar for positioning an O-ring being part of said fitment valve assembly;

(D) an inverted dome structure moulded toward the bottom of said inner surface of said interior ring collar defining at least one opening for the flow of fluid there-through;

(E) a groove for an O-ring moulded in said inner surface of said interior ring collar above said dome structure;

(F) a lip moulded onto said bottom of said interior ring collar for forming a seal with said fitment valve assembly; and (G) a groove for an O-ring moulded in said outer surface at the bottom of said interior ring collar.

2. The adaptor of claim 1, having 4-8 openings in the inverted dome structure.

3. The adaptor of claim 1, wherein said adaptor is a moulded plastic or elastomer.

4. The adaptor of claim 3, wherein said adaptor is moulded polyurethane.

5. A fitment valve assembly comprising:

(A) a fitment for attachment to a container for holding and dispensing a fluid, wherein said container has a generally cylindrical spout attached thereto, wherein said fitment comprises a generally cylindrical external valve body movable to a fixed position within the spout and a generally cylindrical internal valve body movable axially within the external valve body, wherein said internal valve body is movable between a closed position operable to prevent the flow of fluid through said fitment and an open position operable to allow the flow of fluid through said fitment, wherein said internal valve body is movable between closed and open positions by insertion of a dispensing connector into said external valve body adjacent said internal valve body, wherein said internal valve body being is biased toward the closed position; and (B) a collar for attachment to said dispensing connector and for releasable coupling to said fitment, wherein when coupled to said fitment said collar compressively engages said external valve body to form a seal between said external valve body and said dispensing connector and further comprises said adaptor of claim 1 positioned between said fitment and said cylindrical spout of said container containing fluid.

6. The fitment assembly of claim 5, wherein said adaptor is threadably engaged with said fitment and said cylindrical spout.

7. A process for dispensing fluid from a container, wherein said container has a spout attached to it, and wherein said spout is in contact with a fitment valve through an adaptor described claim 1.

8. The process as described in claim 7, wherein said adaptor has 4-8 openings in the inverted dome structure.

9. The process as described in claim 7, wherein said adaptor is a moulded plastic or elastomer.

10. The process as described in claim 7, wherein said adaptor is moulded polyurethane.

11. The process as described in claim 7, wherein said adaptor, is threadably engaged with said fitment and said cylindrical spout.

* * * * *